March 7, 1950 W. D. SUITER 2,499,982
APPARATUS FOR EXTRACTING WATER FROM AIR
Filed Nov. 23, 1945 6 Sheets-Sheet 1

March 7, 1950 W. D. SUITER 2,499,982
APPARATUS FOR EXTRACTING WATER FROM AIR
Filed Nov. 23, 1945 6 Sheets-Sheet 2

Inventor
Will D. Suiter.

By Clarence A. O'Brien
and Harvey B. Jacobson
Attorneys

March 7, 1950 W. D. SUITER 2,499,982
APPARATUS FOR EXTRACTING WATER FROM AIR
Filed Nov. 23, 1945 6 Sheets-Sheet 3
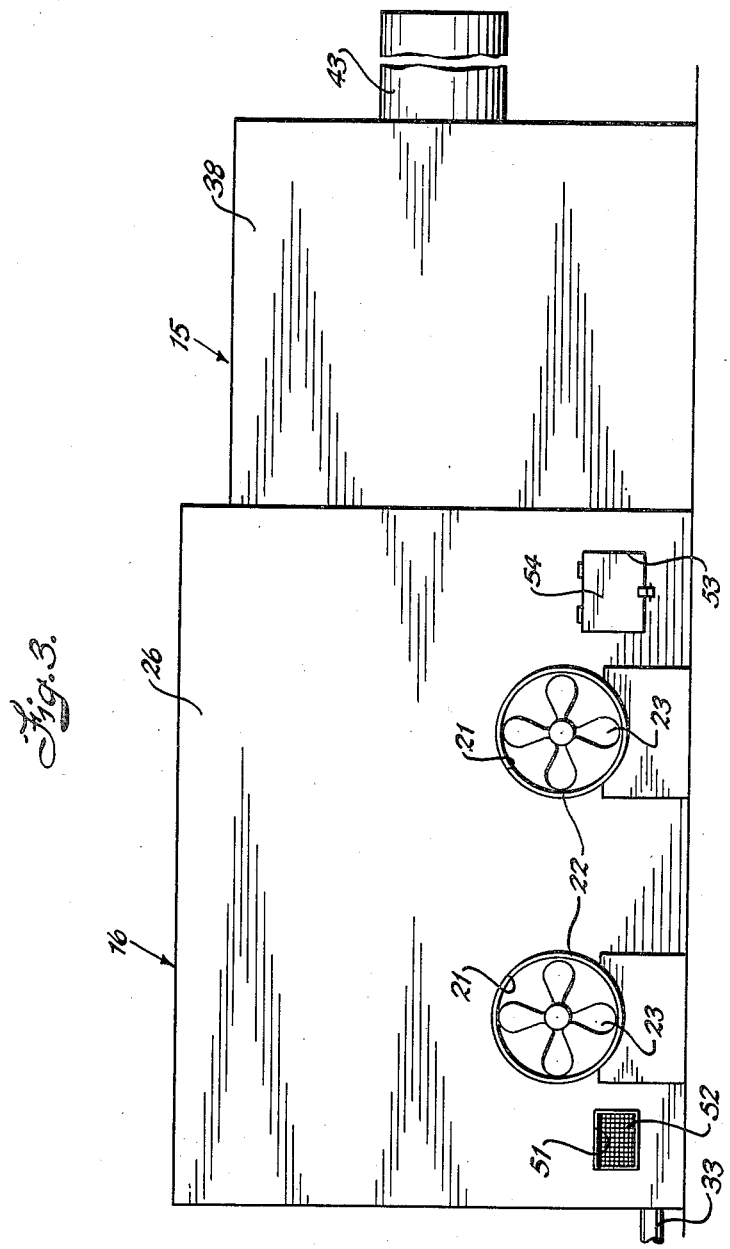
Inventor
Will D. Suiter.
By Clarence A. O'Brien
and Harvey B. Jacobson
Attorneys

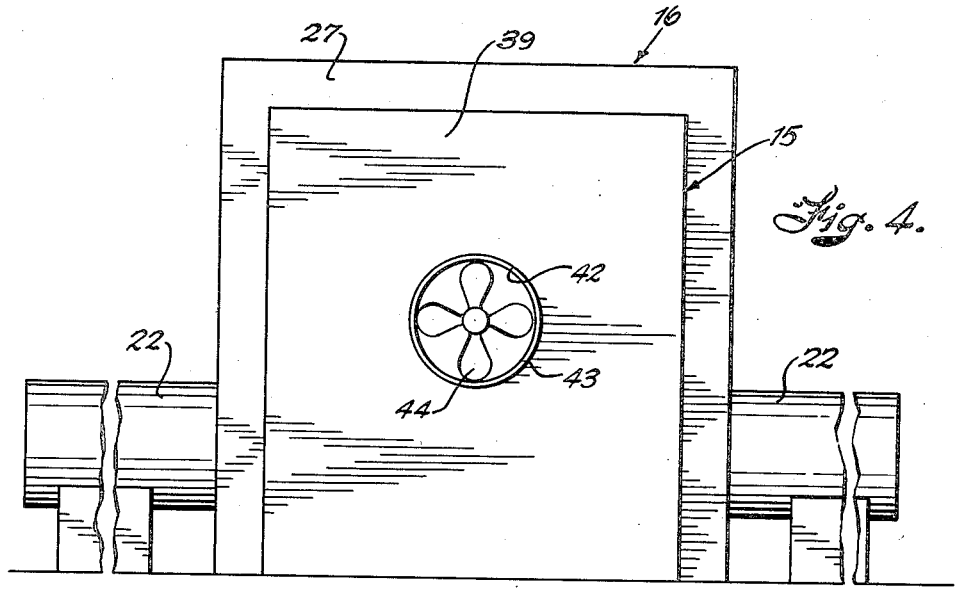
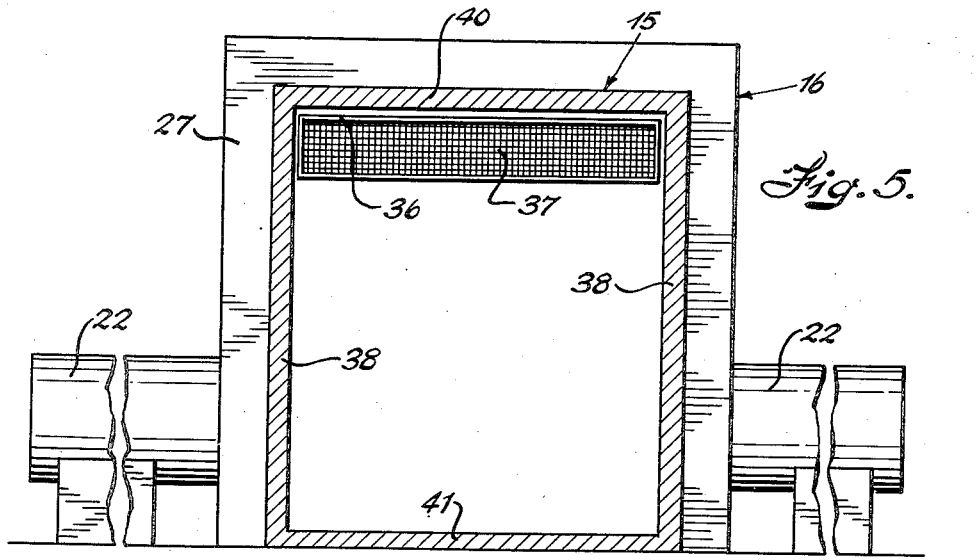

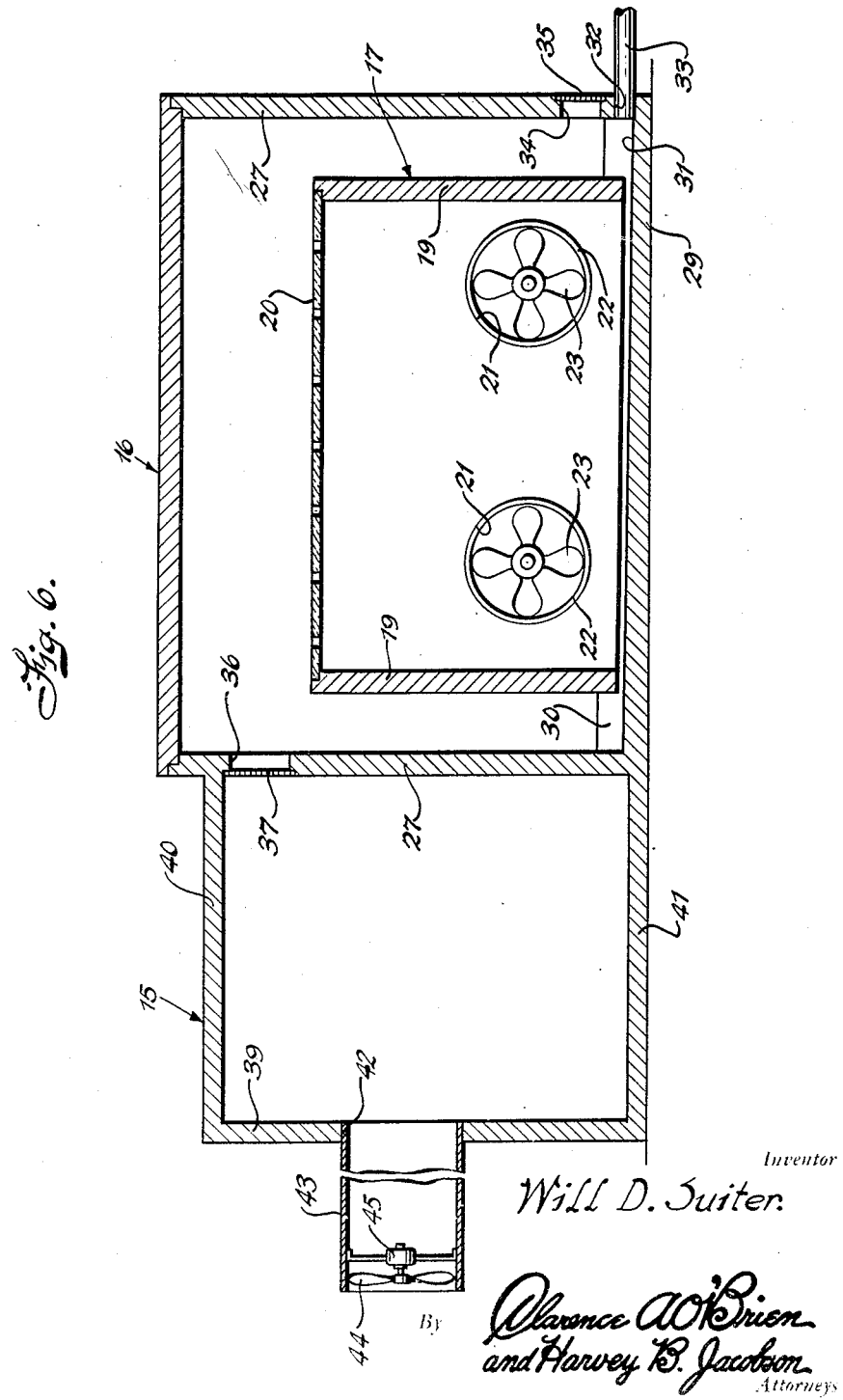

March 7, 1950 W. D. SUITER 2,499,982
APPARATUS FOR EXTRACTING WATER FROM AIR
Filed Nov. 23, 1945 6 Sheets—Sheet 6

Inventor
Will D. Suiter.

By Clarence A. O'Brien
and Harvey B. Jacobson
Attorneys

Patented Mar. 7, 1950

2,499,982

UNITED STATES PATENT OFFICE 2,499,982

APPARATUS FOR EXTRACTING WATER FROM AIR

Will D. Suiter, Winnsboro, Tex.

Application November 23, 1945, Serial No. 630,326

1 Claim. (Cl. 183—5)

This invention relates to apparatus for extracting water from air and more particularly for the production of water to meet various needs such as for domestic purposes, for irrigation, and for many other purposes where natural and adequate water supplies are not available.

The primary object of this invention is to convert the moisture content of a large volume of warm air into water to be distributed and used for various purposes.

Another object is to facilitate the growing of crops in normally arid areas.

The above and other objects may be attained by employing this invention which embodies among its features artificially producing a chilled zone, introducing a volume of warm air into the chilled zone under conditions to cause the chilling of the warm air and a consequent condensation and precipitation of at least a portion of the moisture content of the air so introduced and collecting the precipitated moisture for distribution and use.

Other features include means continuously to create a moving body of warm air, means continuously to create a moving body of chilled air, means to direct the two bodies of air into contact with one another to chill the warm air and condense and precipitate at least a portion of the moisture content thereof, and means to collect the moisture so precipitated for distribution and use.

In the drawings:

Figure 3 is a view from the opposite side of Figure 1.

Figure 4 is an end view of Figure 1.

Figure 5 is a tranverse sectional view taken substantially on the line 5—5 of Figure 1.

Figure 6 is a longitudinal sectional view taken substantially on the line 6—6 of Figure 1.

Figure 1:
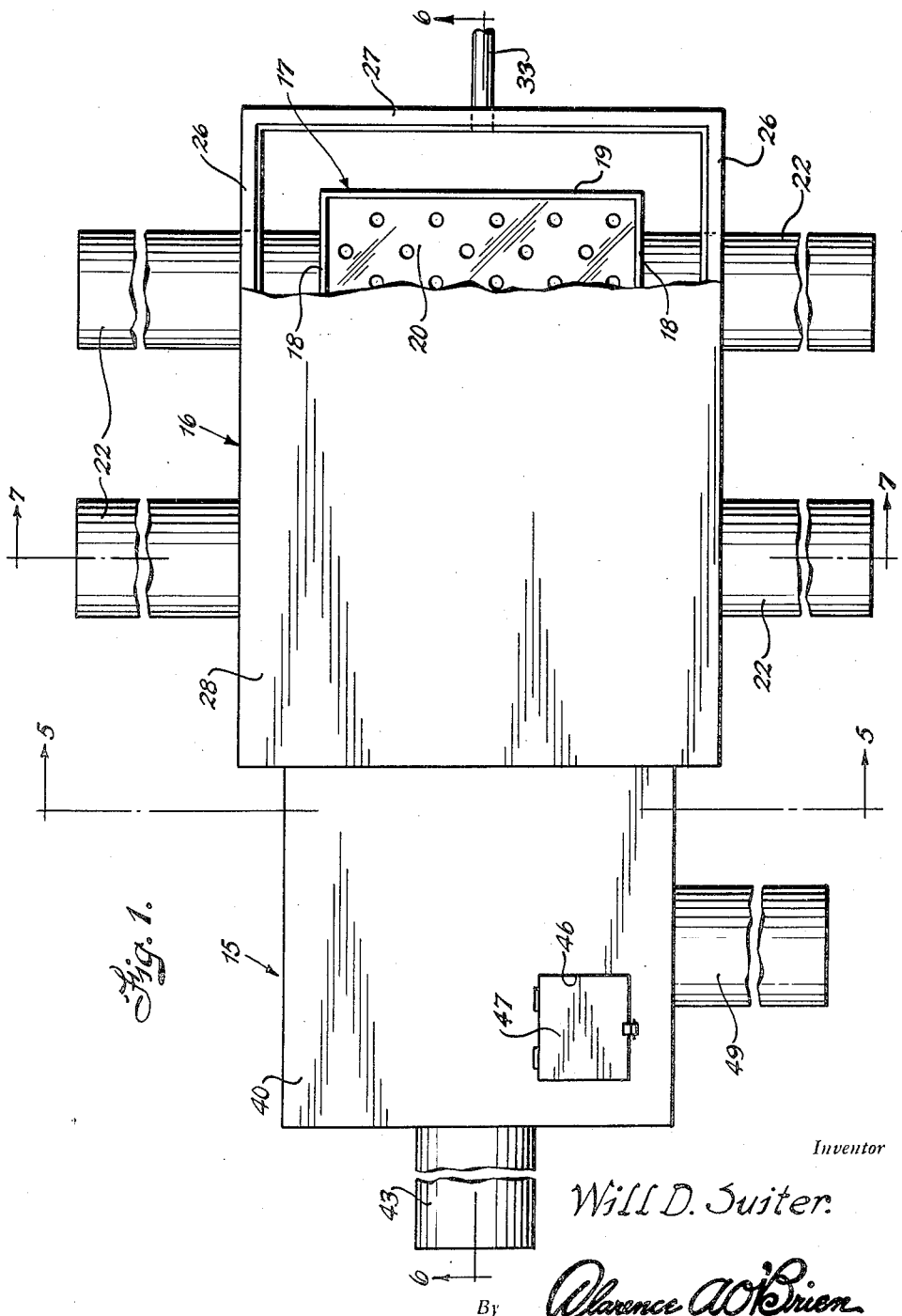
Figure 1 is a top plan view of a plant for producing water in accordance with the features of this invention, certain portions of the cover being broken away to more clearly illustrate the details of construction.
Figure 2:
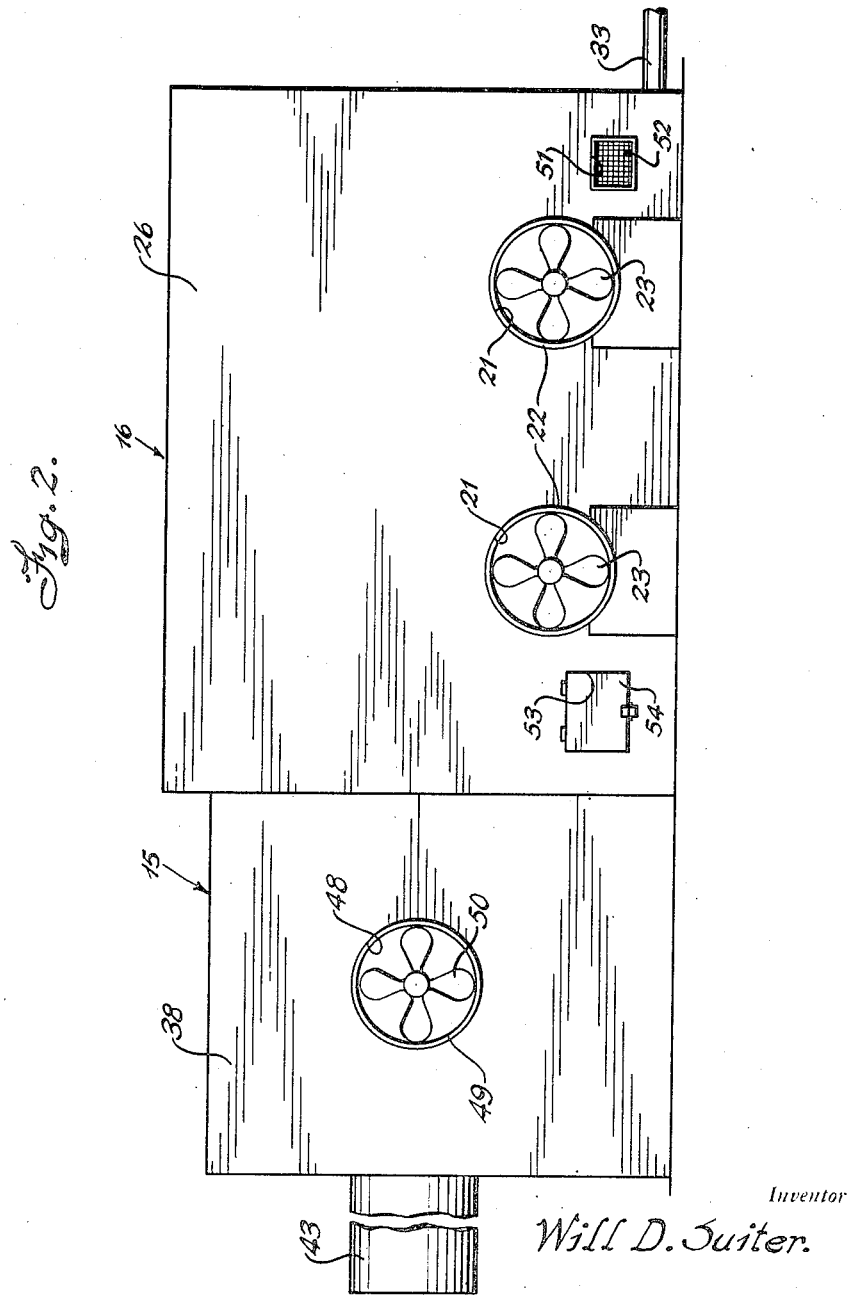
Figure 2 is a side view of Figure 1.
Figure 7:
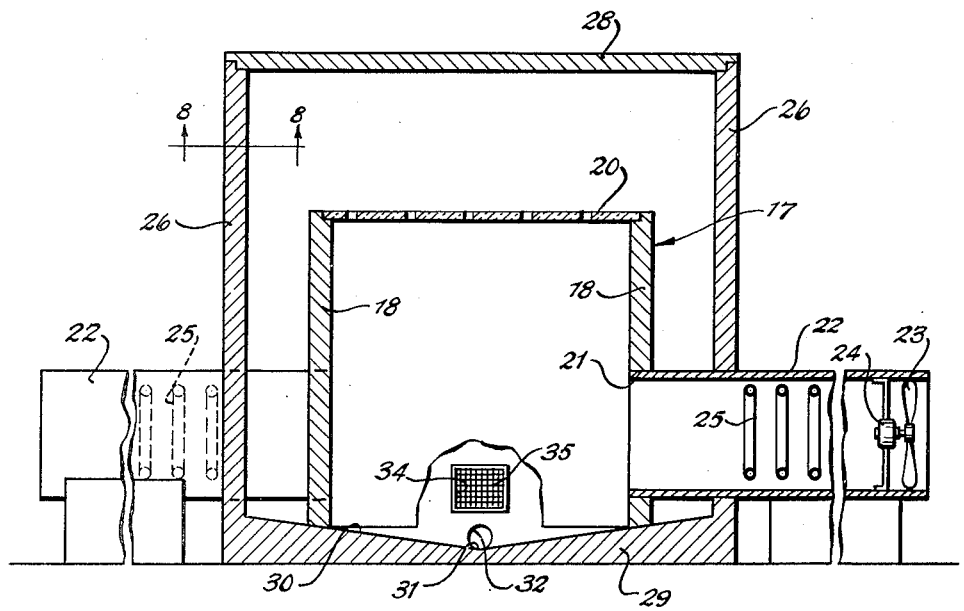
Figure 7 is a transverse sectional view taken substantially on the line 7—7 of Figure 1.
Figure 8:
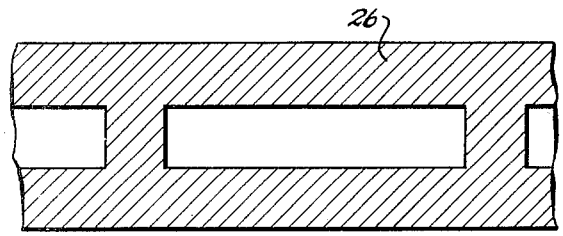
Figure 8 is a fragmentary enlarged sectional view taken substantially on the line 8—8 of Figure 7.

Referring to the drawings in detail my apparatus comprises a cold air generating unit designated generally 15 which is connected in a manner to be more fully hereinafter explained to a condensing and precipitating unit designated generally 16 and a warm air generating and confining unit designated generally 17.

The unit 17 comprises a hollow box-like structure having side walls 18 and end walls 19. The bottom of the unit 17 is wholly open and the top is covered by a smooth but perforated plate 20 the purpose of which will more fully hereinafter appear. Formed in the side walls 18 are spaced openings 21 into which air induction tubes 22 are secured. As illustrated, one end of each tube enters an opening 21 to form a fluid tight joint with the wall 18 while the opposite end of the tube is disposed outwardly thereof and houses a suitable fan 23 which is adapted to be driven by a prime mover such as an electric motor 24. Arranged in each tube 22 may be a suitable heating coil 25 which may take the form of a steam heating radiator which may be connected in any suitable manner to a steam generator, or the heating coil may take the form of electrical resistance coils connected to a suitable power source. In any event, when employed, the heating coil 25 must be of sufficient capacity to materially elevate the temperature of air passing through the tube under the influence of the fan 23. As illustrated, four such tubes are provided, though it is to be understood that any number may be employed in order to supply warm air in adequate volume for the purpose. It will be understood, of course, that the walls 18 and 19 are preferably formed of a material possessing high heat conductivity and that the inner surfaces of said walls are preferably smooth and polished.

The condensing unit designated generally 16 comprises a rectangular housing having side walls 26 and end walls 27 and these walls are preferably of thermally insulated construction so as to avoid, as far as possible, the transfer of heat therethrough. A suitable thermally insulated cover 28 serves to enclose the upper open end of the condensing chamber 16, and the lower edges of the walls 26 and 27 joint a bottom 29 the upper surface of which is inclined as at 30 to form a central trough 31 which communicates with an opening 32 formed in one of the end walls 27 into which a water distribution pipe 33 extends. Formed in the wall 27 in which the opening 32 is formed, and immediately above said opening is a discharge opening 34 covered by a suitable grating 35 through which the air, which has been relieved of at least a part of its moisture, is discharged as will be more fully hereinafter explained. Formed in the end wall 27 opposite that containing the openings 32 and 34 is a cold air inlet opening 36 which like the opening 32 is covered with a suitable grating 37.

Joining the end wall 27, in which the opening 36 is formed, is the refrigerating chamber 15 in which the temperature of the air is reduced far below the dewpoint of the air. This chamber 15 comprises side walls 38 and an end wall 39. The top is closed by a suitable cover 40 and a bottom 41 completes the enclosure. The end wall 39 is provided with a suitable opening 42 into which an air induction tube 43 extends. The tube 43 carries adjacent its outer end a suitable fan 44 which is adapted to be driven by a prime mover 45 such an an electric motor so that when the fan is set into operation air will be drawn into the tube 43 and discharged into the chamber 15. Formed in the cover 40 is a suitable opening 46 which is adapted to be closed by a door 47 and through which ice or any other suitable refrigerant may be introduced into the air chilling chamber 15. While ice is mentioned as the refrigerant for chilling the air, it is to be understood that mechanical refrigeration may be substituted or dry ice may be used, according to the facilities at hand. In addition to the opening 42 in the end wall 39 a similar opening 48 may be arranged in one of the side walls 38 and like the opening 42 is provided with a tube 49 in which a fan 50 which may be driven in any suitable manner is mounted to introduce a flow of air from the surrounding atmosphere into the chamber 15.

The operation of the device is as follows: Warm air is inducted into the tubes 22 and subsequently discharged into the chamber 17. If so desired it may be further warmed by energizing the heating coils 25. Simultaneously, air is inducted through the tubes 43 and 49 into the chamber 15 where it contacts the refrigerant so that its temperature is lowered far below the dewpoint of the air. The air from the chamber 15 after having been properly refrigerated enters the chamber 16 through the grill 37 and opening 36 where it is distributed around the chamber 17 to chill the walls 18 and 19. Such chilling of the walls 18 and 19 causes the moisture contained in the warm air introduced into the chamber 17 to condense on the walls 18 and 19 and at the same time the cold air flowing over the top of the cover 20 will tend to fall through the perforations therein and upon encountering the warm air which is rising in the chamber 17 a condensation and precipitation of the moisture contained in the warm air will result. The moisture thus precipitated and that which collects on the walls 18 and 19 will fall into the trough 31 where it is collected and discharged through the pipe 33 for distribution and use. The air from which the moisture has been extracted and the cold air will find its way out of the apparatus through the passage 34 and the grill 35. Should it be found that the opening 34 is insufficient to take care of all of the air to be discharged from the interior of the device, it is obvious that suitable openings 51 may be provided in the side walls 26 and fitted with grills 52 through which the excess air may be discharged. Should it be found that the cold air enveloping the warm air chamber 17 is insufficient properly to refrigerate the walls 18 and 19, suitable openings 53 closed by doors 54 may be arranged in the side walls 26 to permit the introduction of a suitable refrigerant into the space between the walls 18 and 26 and the walls 19 and 27.

From the foregoing, it will be apparent, that by bringing a warm current of air into contact with a chilled current of air the moisture content of the warm air will be condensed and precipitated in the form of drops or droplets of water which when collected in the trough 31 may be employed for many useful purposes.

I claim:

1. Apparatus for the condensation and precipitation of at least a portion of the moisture content of a body of warm air which includes a refrigerating chamber, means continuously to move a first portion of warm air through the refrigerating chamber to chill the said air far below its dewpoint, a warm air chamber through which a second portion of said warm air is continuously moved, a perforated top for the escape of the air from said warm air chamber, a jacket enclosing the warm air chamber in spaced relation thereto into which the chilled air is introduced from the refrigerating chamber to reduce the temperature of the walls of said warm air chamber thereby lowering the temperature of said second portion of warm air and condensing moisture therefrom, and means to extend beneath the warm air chamber and the jacket to collect the moisture so condensed and to deliver it toward one end of the apparatus.

WILL D. SUITER.

REFERENCES CITED

The following references are of record in the file of this patent:

UNITED STATES PATENTS

| Number | Name | Date |
|---|---|---|
| 691,170 | Pardridge | Jan. 14, 1902 |
| 1,310,511 | Summers | July 22, 1919 |
| 1,622,134 | Dumars et al. | Mar. 22, 1927 |
| 2,203,685 | Kaufman | June 11, 1940 |